(12) United States Patent
Hirose

(10) Patent No.: US 7,627,446 B2
(45) Date of Patent: Dec. 1, 2009

(54) DIVING INFORMATION PROCESSING DEVICE, CONTROL METHOD FOR A DIVING INFORMATION PROCESSING DEVICE, AND A CONTROL PROGRAM

(75) Inventor: Takeshi Hirose, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 468 days.

(21) Appl. No.: 11/649,278

(22) Filed: Jan. 4, 2007

(65) Prior Publication Data
US 2007/0162254 A1 Jul. 12, 2007

(30) Foreign Application Priority Data
Jan. 10, 2006 (JP) .............................. 2006-002955

(51) Int. Cl.
*G06F 15/00* (2006.01)
(52) U.S. Cl. ..................................................... 702/139
(58) Field of Classification Search ................. 702/139, 702/47, 50, 141, 142, 150, 158, 166; 73/865.1; 128/201.27, 204.22, 204.23
See application file for complete search history.

(56) References Cited
U.S. PATENT DOCUMENTS

| | | | | |
|---|---|---|---|---|
| 6,519,548 | B1 * | 2/2003 | Kuroda et al. ................ | 702/139 |
| 7,144,198 | B2 * | 12/2006 | Hirose et al. ................. | 405/186 |
| 7,448,378 | B2 * | 11/2008 | Hirose ......................... | 128/201.27 |
| 2002/0016694 | A1 * | 2/2002 | Tsuji ............................ | 702/138 |
| 2005/0004711 | A1 * | 1/2005 | Hirose .......................... | 700/265 |
| 2005/0095067 | A1 | 5/2005 | Hirose et al. | |
| 2005/0205092 | A1 * | 9/2005 | Claude et al. ........... | 128/204.22 |
| 2006/0012484 | A1 * | 1/2006 | Claude ...................... | 340/573.6 |
| 2007/0283953 | A1 * | 12/2007 | Angelini et al. ......... | 128/201.27 |

FOREIGN PATENT DOCUMENTS

| | | |
|---|---|---|
| EP | 0745915 A2 | 12/1996 |
| JP | H08-327355 A | 12/1996 |
| JP | 2003-118690 * | 4/2003 |
| JP | 2003-118690 A | 4/2003 |

* cited by examiner

*Primary Examiner*—Michael P. Nghiem
*Assistant Examiner*—Cindy H Khuu
(74) *Attorney, Agent, or Firm*—Global IP Counselors, LLP

(57) ABSTRACT

If the diving mode is erroneously entered while travelling at a high altitude, such as when flying in an airplane, the error is detected so that calculating tissue in/out-gassing of inert gases continues. The control unit 50 of the dive computer records the water depth corresponding to the pressure measured by the depth measuring unit 61 together with the elapsed time, determines if the user is moving in a low pressure region based on water entry detection by a water entry detection unit and the depth detected by the depth measuring unit 61, and if the user is determined to be travelling in a low pressure region cancels measuring the water depth, cancels the wrongly selected operating mode, and changes from the operating mode used when diving to an operating used when not diving.

11 Claims, 11 Drawing Sheets

DIVING INFORMATION PROCESSING DEVICE, CONTROL METHOD FOR A DIVING INFORMATION PROCESSING DEVICE, AND A CONTROL PROGRAM

BACKGROUND

1. Technical Field

The present invention relates generally to a diving information processing device and to a control method and a control program for a diving information processing device, and relates more particularly to technology for preventing a drop in the reliability of diving information resulting from erroneously entering the diving mode.

2. Related Art

Information devices having functions for measuring water depth and keeping time are commonly used when diving. Diving information processing devices, also referred to as dive computers, have functions for measuring change in water pressure while diving and change in air pressure when flying based on these measurements and simulating tissue absorption and elimination of inert gases (particularly nitrogen), also called in-gassing and out-gassing, so that the diver can dive safely and avoid decompression sickness.

As taught in Japanese Unexamined Patent Appl. Pub. H8-327355A, a dive computer with a depth gauge measures the air pressure at a predetermined time interval, automatically enters the diving mode from any display mode when conductivity is detected as a result of a water detection switch composed of two electrodes entering water, and starts measuring water depth at a predetermined time interval based on the air pressure when the diving mode was entered to denote 0 meters. If water entry is detected, a water depth exceeding a predetermined threshold is then detected, and the water detection switch then remains continuously off, the diving mode is cancelled and the time is displayed. After water entry is detected and the predetermined depth is detected, an on-switch counting circuit also checks the on/off status of the water detection switch, blocks entering the diving mode if the water detection switch is off, and continues displaying the time.

However, temporary opening of the water detection switch may be detected as a result of bubbles in the air exhaled by the diver or the formation of an insulation layer on the surface of the conductivity switch contacts that detect water entry even after the predetermined diving depth is detected after diving starts, and this can prevent displaying the diving information even though the diver is still in the water. This is a fatal problem for an information device that is relied upon by the diver for safe diving management.

The water detection switch may also detect conductivity when not diving as a result of the dive computer being placed with other wet items or even simply being worn in contact with the body. If the diving mode is wrongly entered due to such detection of conductivity while the user is at a high altitude, such as when flying, and the air pressure then changes due to a drop in altitude, the pressure difference may be erroneously measured and displayed as an increase in water depth.

If the diving mode is simply cleared and the display is restored to the state before high altitude movement, all tissue in/out-gassing calculations will be cleared, the effect of the change in air pressure due to travel at high altitude on the body will not be considered by the diving mode, and the advantage of using a portable device, specifically the ability to continuously measure and calculate tissue in/out-gassing based on the measurements, is lost.

The diving information processing device and the control method and control program for a diving information processing device according to the present invention enable recognizing if the diving mode is erroneously entered while travelling at high altitude so that calculating tissue in/out-gassing of inert gases can continue.

SUMMARY

A diving information processing device according to a preferred aspect of the invention has a pressure measuring unit for measuring ambient pressure; a time keeping unit for measuring elapsed time; a water entry detection unit for detecting an in-water condition; a diving evaluation unit for determining that a diver is diving when an in-water condition is detected and the water depth corresponding to the pressure measured by the pressure measuring unit is deeper than a predetermined diving evaluation depth; a depth measuring unit for measuring the water depth corresponding to the pressure measured by the pressure measuring unit during a dive; a depth recording unit for recording the water depth and the elapsed time; a low pressure region evaluation unit for determining movement in a low pressure region where the pressure is lower than a predetermined atmospheric reference pressure based on water entry detection by the water entry detection unit and the pressure measured by the pressure measuring unit; and a depth measuring cancellation unit for cancelling depth measurement by the depth measuring unit when travel in a low pressure region is detected.

The pressure measuring unit in this arrangement measures ambient pressure, the timekeeping unit measures the elapsed time, and the water entry detection unit detects entry into water.

As a result, the diving evaluation unit determines that a diver is diving when entry into water is detected and the water depth corresponding to the pressure measured by the pressure measuring unit is deeper than a predetermined diving evaluation depth, and when an in-water condition denoting diving is detected, the depth measuring unit measures the water depth corresponding to the pressure measured by the pressure measuring unit during a dive.

Parallel to this operation the low pressure region evaluation unit determines movement in a low pressure region where the pressure is lower than a predetermined atmospheric reference pressure based on water entry detection by the water entry detection unit and the pressure measured by the pressure measuring unit, and the depth measuring cancellation unit cancels depth measurement by the depth measuring unit when travel in a low pressure region is detected.

Preferably, the low pressure region evaluation unit detects movement in a low pressure region if the water entry detection unit detects a not-in-water condition continuously for a predetermined time after the diving evaluation unit has determined that the diver is diving.

Further preferably, the water entry detection unit has detection electrodes for detecting conductivity through external water, and detects water entry when there is conductivity between the detection electrodes.

Yet further preferably, the diving information processing device also has a pressure measurement resetting unit for resetting the pressure measuring unit at a predetermined pressure measurement timing of the pressure measuring unit when not diving.

The diving information processing device according to another aspect of the invention also has a pressure measurement resetting unit for resetting the pressure measuring unit when a predetermined reset standby time passes after depth measurement is cancelled by the depth measuring cancellation unit.

In another aspect of the invention the pressure measurement resetting unit measures the atmospheric reference pressure when resetting the pressure measuring unit.

Yet further preferably, the diving information processing device also has a standby time setting unit enabling the user to desirably set the reset standby time.

In another aspect of the invention the diving information processing device also has a safety information derivation unit for calculating tissue absorption and tissue elimination of inert gas based on the pressure and the elapsed time.

In another aspect of the invention the diving information processing device also has an operating unit enabling user operations; and a manual recording cancellation unit for cancelling recording by the depth recording unit when a specific operation is executed on the operating unit.

Another aspect of the invention is a control method for a diving information processing device having a pressure measuring unit for measuring ambient pressure, a timekeeping unit for measuring elapsed time, a water entry detection unit for detecting an in-water condition, a diving evaluation unit for determining that a diver is diving when an in-water condition is detected and the water depth corresponding to the pressure measured by the pressure measuring unit is deeper than a predetermined diving evaluation depth, and a safety information derivation unit for calculating tissue absorption/ elimination of inert gas based on the pressure and the elapsed time while diving. The control method has a diving evaluation step for determining that a diver is diving when an in-water condition is detected and the water depth corresponding to the pressure measured by the pressure measuring unit is deeper than a predetermined diving evaluation depth; a depth recording step for recording the water depth corresponding to the pressure measured by the pressure measuring unit together with the elapsed time during a dive; a high altitude movement evaluation step for detecting travel at a high altitude based on water entry detection by the water entry detection unit and the pressure measured by the pressure measuring unit; and a recording cancellation step for cancelling recording by the depth recording step when high altitude travel is detected.

Another aspect of the invention is a control program for controlling by means of a computer a diving information processing device having a pressure measuring unit for measuring ambient pressure, a timekeeping unit for measuring elapsed time, a water entry detection unit for detecting an in-water condition, a diving evaluation unit for determining that a diver is diving when an in-water condition is detected and the water depth corresponding to the pressure measured by the pressure measuring unit is deeper than a predetermined diving evaluation depth, and a safety information derivation unit for calculating tissue absorption/elimination of inert gas based on the pressure and the elapsed time while diving. The control program causes the diving information processing device to: determine that a diver is diving when an in-water condition is detected and the water depth corresponding to the pressure measured by the pressure measuring unit is deeper than a predetermined diving evaluation depth; record the water depth corresponding to the pressure measured by the pressure measuring unit together with the elapsed time during a dive; detect travel at a high altitude based on water entry detection by the water entry detection unit and the pressure measured by the pressure measuring unit; and cancel recording in the depth recording step when high altitude travel is detected.

Effect of the Invention

If the diving information processing device erroneously enters the diving mode during travel at high altitude, the invention enables recognizing the error and continues calculating tissue in/out-gassing, thereby improving the reliability of the collected data and providing safety information that is more highly reliable.

Other objects and attainments together with a fuller understanding of the invention will become apparent and appreciated by referring to the following description and claims taken in conjunction with the accompanying drawings.

DESCRIPTION OF EXEMPLARY EMBODIMENTS

Preferred embodiments of the present invention are described below with reference to the accompanying figures.

1. General Configuration

Figure 1:
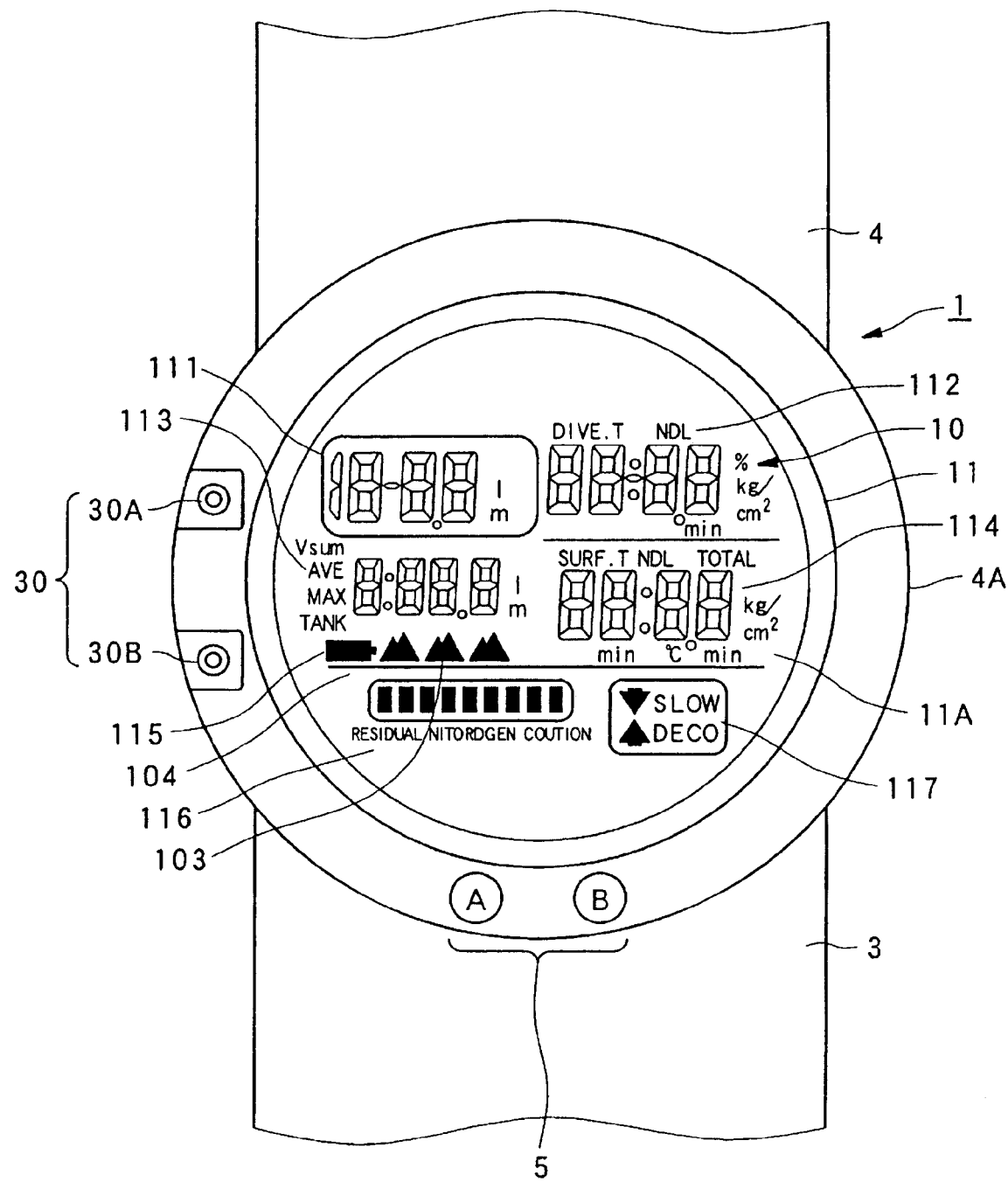
FIG. 1 shows the face of a diving information processing device according to the present invention.

FIG. 1 shows the appearance of a diving information processing device according to a preferred embodiment of the invention.

As shown in FIG. 1 this diving information processing device (referred to below as a dive computer) 1 measures tissue absorption of nitrogen while diving (the partial pressure of nitrogen in body tissues, referred to below as the "tissue nitrogen partial pressure"), and based on the result displays how long the diver should remain at the surface after diving. This dive computer 1 has wrist bands 3 and 4 attached to the body 2 at the 6:00 and 12:00 positions of a wristwatch, and can be worn on the wrist similarly to a wristwatch by means of the wrist bands 3 and 4. The body 2 has a top case and bottom case held together with screws to form a water-tight seal, and internally houses a circuit board (not shown in the figure) populated with various electronic components. A button cell (not shown in the figure) inside the body 2 powers the dive computer 1.

A display unit 10 is rendered on top of the body 2 using an LCD panel 11, and two pushbutton switches A and B are disposed at the 6:00 position of the wristwatch. This makes it easy to operate the switches while diving. As further described below, switches A and B render an operating unit 5 for selecting and changing the various modes of the dive computer 1. A water entry monitoring switch 30 (moisture detection sensor) for monitoring whether diving started is rendered at the 9:00 position of the wristwatch on the dial side of the body 2.

The water entry monitoring switch 30 has two electrodes 30A and 30B exposed at the surface of the body. Exposure to seawater, for example, results in conductivity between the electrodes 30A and 30B. The dive computer 1 is considered to be underwater when resistance between the electrodes 30A and 30B is low. This water entry monitoring switch 30 simply detects whether the dive computer 1 is in water and is used for enabling the diving mode but does not determine if a dive has started. The wrist on which the dive computer 1 is worn could simply be in water, for example, and immersion in water alone should therefore not be used to decide if a dive has started. A dive computer 1 according to this embodiment of the invention therefore determines that a dive started when the water depth (water pressure) detected by an internal pressure sensor in the body exceeds a specific level, which in this embodiment of the invention is 1.5 meters (the water depth for determining the start of a dive).

Figure 2:
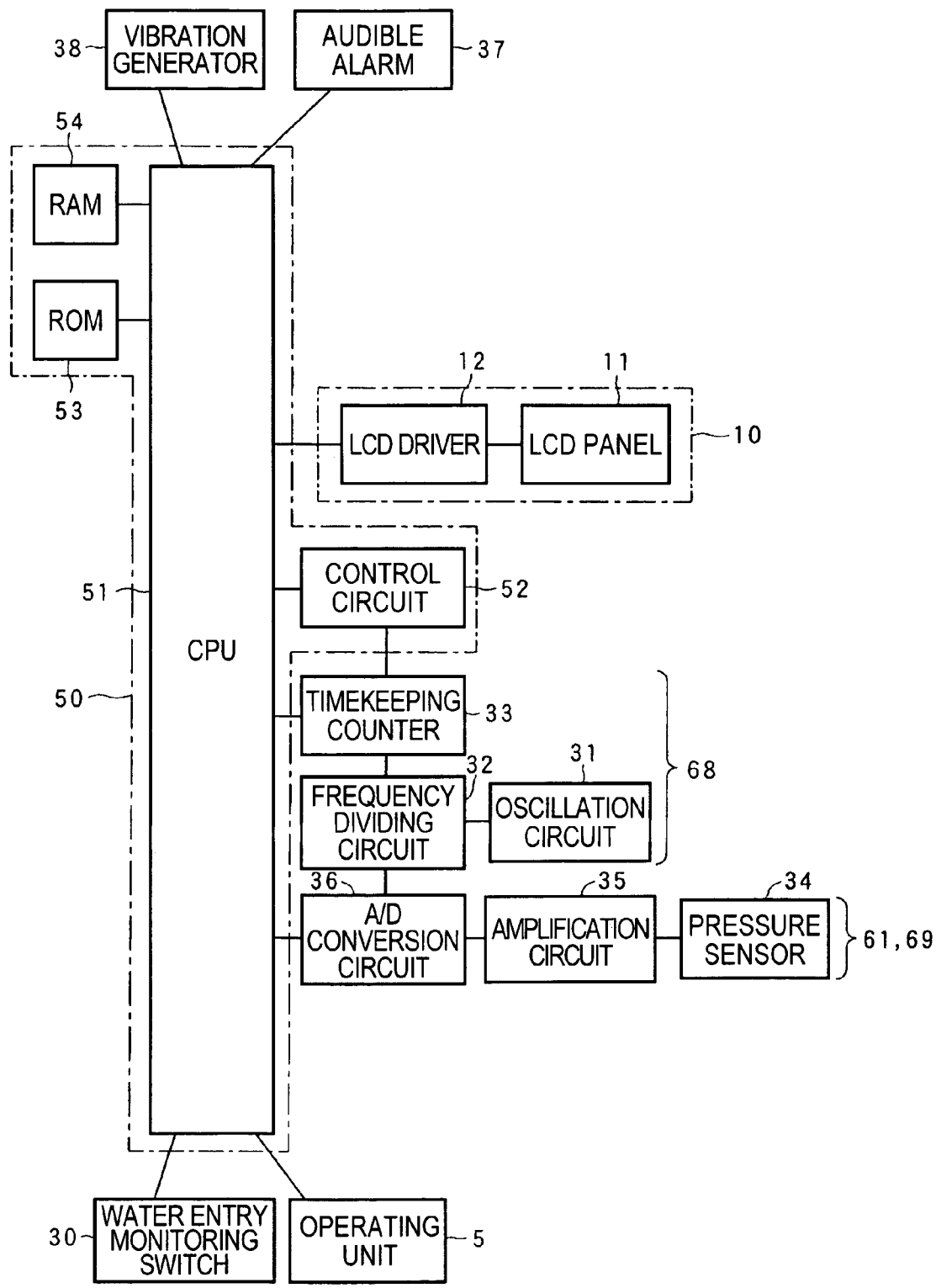
FIG. 2 is a block diagram of a dive computer according to a preferred embodiment of the invention.

FIG. 2 is a block diagram of the diving information processing device according to this embodiment of the invention.

As shown in FIG. 2 the dive computer 1 according to this embodiment has a display unit 10 and a control unit 50. The display unit 10 includes an LCD panel 11 for displaying and reporting information to the user, and an LCD driver 12 for driving the LCD panel 11. The control unit 50 runs the processes executed in each operating mode, and displays information in each operating mode on the LCD panel 11. Output from the switches A and B and water entry monitoring switch 30 is input to the control unit 50.

In order for the dive computer 1 to keep time to display the regular time and diving time, a time keeping unit 68 is also disposed to the control unit 50. The timekeeping unit 68 has an oscillation circuit 31 that outputs a clock signal through the frequency dividing circuit 32 to a timekeeping counter 33 which keeps time in one-second units.

The dive computer 1 also has a depth measuring unit 61 in order to measure and display the water depth while diving and calculate the amount of nitrogen (inert gas) that accumulates in body tissues based on the water depth (water pressure) and diving time. The depth measuring unit 61 includes a pressure sensor 34 (semiconductor pressure sensor), an amplification circuit 35 that amplifies the output signal from the pressure sensor 34, and an A/D conversion circuit 36 that converts the analog signal output from the amplification circuit 35 to a digital signal and outputs the digital signal to the control unit 50. The pressure sensor 34 can be used to measure both water depth and air pressure, or separate sensors can be used. Using the pressure sensor 34 to measure both water depth and air pressure facilitates reducing the size of the portable device and adjusting for any difference in the reference value of the pressure at a depth of 0 meters and an altitude of 0 meters.

In this embodiment of the invention the pressure sensor 34 is used to measure both water depth and air pressure. In the atmospheric pressure modes, specifically the surface mode ST2, planning mode ST3, and log mode ST6 further described below, in which the water entry monitoring switch 30 is open the air pressure measuring unit 69 measures the air pressure at a regular predetermined interval and the altitude range evaluation unit 95 determines in which of predefined altitude zones (ranges) the user is located.

In order for the dive computer 1 to handle sudden air pressure changes due to high altitude movements and the in/out-gassing of inert gases (nitrogen) by the tissues as a result of change in altitude, the altitude range comparison unit 96 compares the current altitude range detected by the altitude range evaluation unit 95 with the previously detected altitude range, starts calculating tissue in/out-gassing of nitrogen if the altitude range has changed, and activates the surface mode ST2 to display the time passed and the inert gas acclimatization time since the altitude range changed.

The dive computer 1 of this embodiment also has an audible alarm 37 and a vibration generator 38 enabling the audible alarm 37 to issue audible alarms and the vibration generator 38 to issue tactile alarms. As the amount of nitrogen dissolved in body tissues increases, nitrogen has a narcotic effect that can cause the diver to behave irrationally without being aware of it or losing consciousness. Providing such alarms can therefore help enable safer diving. Particularly for someone whose ability to evaluate the situation and recognize danger is impaired, the vibration generator 38 can issue an alarm that stimulates the diver more acutely than other types of alarms.

The control unit 50 has a CPU 51 that controls overall operation of the dive computer 1, a control circuit 52 that controls the LCD driver 12 and timekeeping counter 33 as instructed by the CPU 51, ROM 53, and RAM 54. The control unit 50 implements the operating modes described below by means of the CPU 51 running a program stored in ROM 53. RAM 54 temporarily stores data (diving information) collected while diving, and stores log data for reproducing the diving information when in the log mode described below.

1.1 Display Unit

Referring again to FIG. 1, the display surface of the LCD panel 11 is organized into seven display areas.

The first display area 111 is located near the 12:00 position of an analog wristwatch and is the largest of the seven display areas. The first display area 111 displays the current water depth, the current date, the depth rank, and the dive date (log number) when in the diving mode, surface mode (timekeeping mode), planning mode, and log mode, respectively, as further described below.

The second display area 112 is on the 3:00 side of the first display area 111, and displays the diving time, current time, no-decompression dive time, and dive start time (diving time) in the diving mode, surface mode (timekeeping mode), planning mode, and log mode, respectively.

The third display area 113 is on the 6:00 side of the first display area 111, and displays the maximum depth, nitrogen elimination time, safety level, and maximum depth (average depth) in the diving mode, surface mode (timekeeping mode), planning mode, and log mode, respectively.

The fourth display area 114 is on the 3:00 side of the third display area 113 and displays the no-decompression dive time, surface resting time, temperature, dive end time (water temperature at maximum depth) in the diving mode, surface mode (timekeeping mode), planning mode, and log mode, respectively.

The fifth display area 115 is on the 6:00 side of the third display area 113, and displays the low battery warning 104 and altitude range 103.

The sixth display area 116 is closest to the 6:00 side position the LCD panel 11 and graphically displays the tissue nitrogen absorption level.

The seventh display area 117 is on the 3:00 side of the sixth display area 116, and when the diving mode determines the diver is in a decompression dive indicates whether the tissues are tending to absorb or eliminate nitrogen (inert gas). The seventh display area 117 has a SLOW indicator that is one of the rapid ascent warnings issued when the ascent speed is too fast, and a DECO indicator that warns the diver when the dive has become a decompression dive.

By making the area (first display area 111) for displaying the current water depth when in the diving mode the largest display area on the LCD panel 11, the diver can easily read the current depth, which is essential to safe diving. Furthermore, even if the display surface of the LCD panel 11 is recessed from the surface of the top case so that the top case forms a ridge around the edge of the top of the LCD panel 11, the current depth display will not be hidden by this ridge because the display area (first display area 111) of the current depth that is displayed in the diving mode is located near the 12:00 position. This arrangement therefore makes reading essential current depth data easier with the information processing device 1 according to this embodiment of the invention.

1.2 Safety Information Derivation Unit

Figure 3:
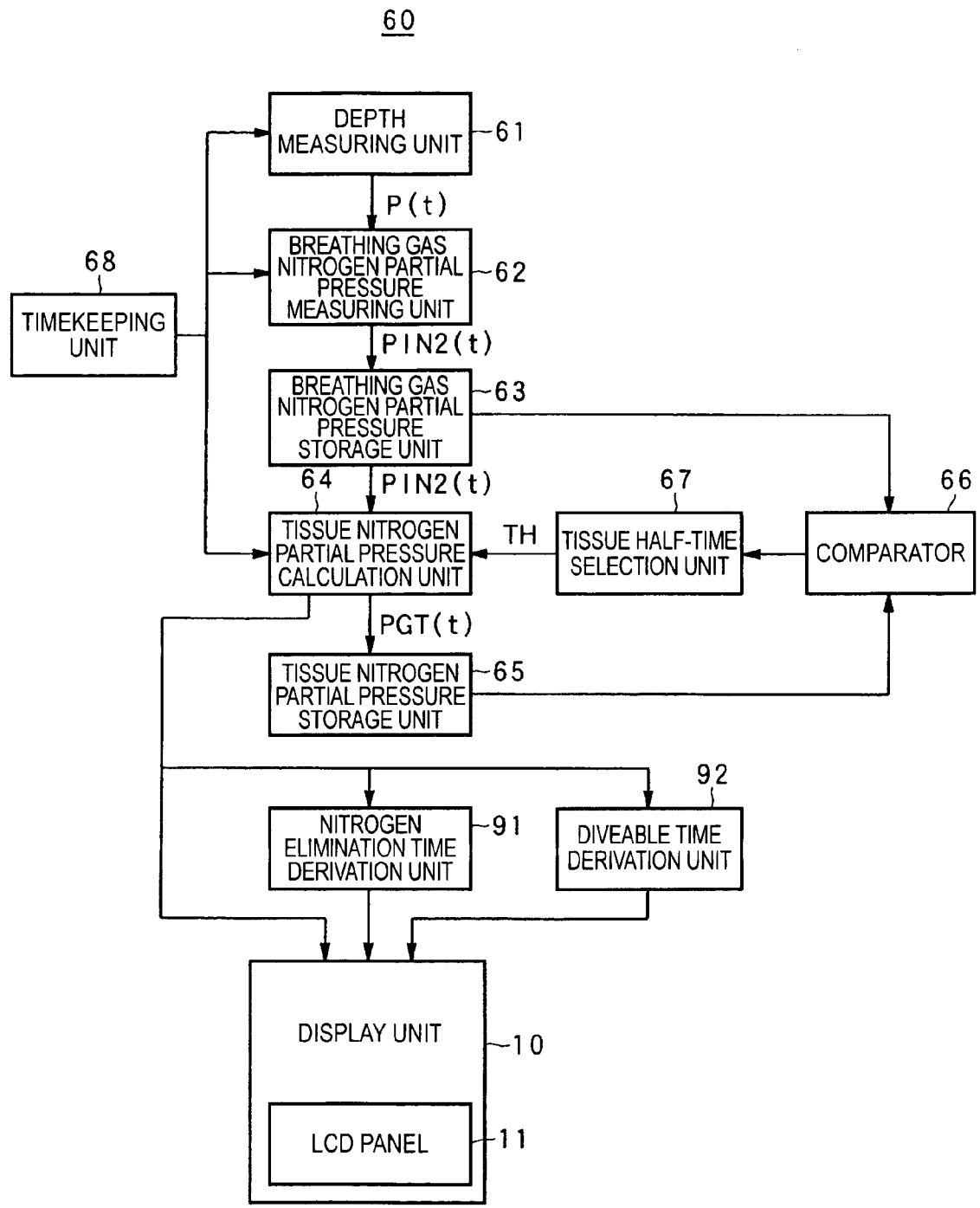
FIG. 3 is a function block diagram of the safety information derivation unit.

FIG. 3 is a function block diagram of the safety information derivation unit for calculating tissue nitrogen absorption (tissue accumulation of inert gases) and deriving therefrom the nitrogen elimination time and no-decompression dive time in the dive computer 1 according to this embodiment of the invention.

As shown in FIG. 3 the safety information derivation unit 60 of this dive computer 1 simulates the absorption and elimination by the tissues of nitrogen in the breathing gas to calculate the tissue nitrogen level (tissue nitrogen partial pressure).

Based on the tissue nitrogen level, the safety information derivation unit 60 derives the no-decompression dive time, that is, how long of a dive is possible at a certain depth without requiring decompression, and how much surface time is required to eliminate supersaturated nitrogen accumulated in the tissues over previous dives (nitrogen elimination time or inert gas elimination time), as safety information to help the diver dive safely.

Calculating the tissue nitrogen level is described briefly by way of example only below as various methods can be used.

The safety information derivation unit 60 includes a depth measuring unit 61 that uses the pressure sensor 34, amplification circuit 35, and A/D conversion circuit 36 shown in FIG. 2 to calculate tissue nitrogen absorption as a partial pressure value; a breathing gas nitrogen partial pressure measuring unit 62 that is rendered as a function of the CPU 51, ROM 53, and RAM 54 in FIG. 2; a breathing gas nitrogen partial pressure storage unit 63 using RAM 54 shown in FIG. 2; a tissue nitrogen partial pressure calculation unit 64 that is rendered as a function of the CPU 51, ROM 53, and RAM 54 in FIG. 2; a tissue nitrogen partial pressure storage unit 65 using RAM 54 shown in FIG. 2; a timekeeping unit 68 using the timekeeping counter 33 shown in FIG. 2; a comparator 66 rendered as a function of the CPU 51, ROM 53, and RAM 54 in FIG. 2 for comparing data stored in the breathing gas nitrogen partial pressure storage unit 63 and tissue nitrogen partial pressure storage unit 65; and a tissue half-time selection unit 67 that is rendered as a function of the CPU 51, ROM 53, and RAM 54 in FIG. 2.

Of these components the breathing gas nitrogen partial pressure measuring unit 62, tissue nitrogen partial pressure calculation unit 64, comparator 66, and tissue half-time selection unit 67 can be rendered in software that is run using the CPU 51, ROM 53, and RAM 54 in FIG. 2, using only logic circuits and other hardware components, or as a combination of software and a processing circuit including logic circuits and a CPU.

In this embodiment the depth measuring unit 61 measures and outputs water pressure P(t) at time t.

The breathing gas nitrogen partial pressure measuring unit 62 calculates and outputs breathing gas nitrogen partial pressure PIN2(t) based on the water pressure P (t) output from the depth measuring unit 61. This breathing gas nitrogen partial pressure PIN2(t) can be calculated from the water pressure P(t) while diving using the following equation.

$$PIN2(t) = 0.79 \times P \text{ [bar]}$$

The breathing gas nitrogen partial pressure storage unit 63 stores the PIN2(t) value obtained from the above equation by the breathing gas nitrogen partial pressure measuring unit 62.

The tissue nitrogen partial pressure calculation unit 64 calculates tissue nitrogen partial pressure PGT(t) for each of the tissues having a different nitrogen absorption/elimination rate. The tissue nitrogen partial pressure PGT(tE) of absorption/elimination from dive time t=t0 to tE for a single tissue can be calculated from the tissue nitrogen partial pressure PGT(t0) at time t0, dive time tE, and tissue half-time TH.

Figure 4:
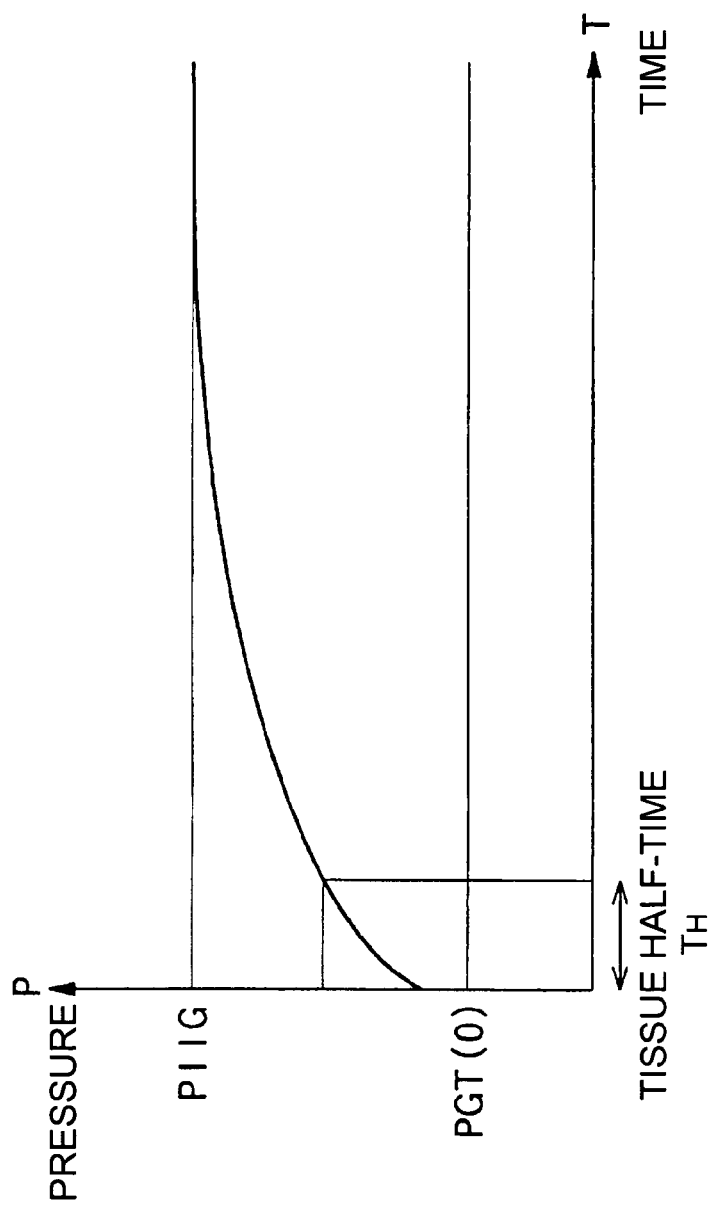
FIG. 4 is a graph describing the tissue half-time of the dive computer.

As shown in FIG. 4, tissue half-time TH is the time (half-time) required for the tissue nitrogen partial pressure PGT(tE) to reach the midpoint between the tissue nitrogen partial pressure PGT(t0) and breathing gas nitrogen partial pressure PIIG as the tissue nitrogen partial pressure PGT(tE) goes from the tissue nitrogen partial pressure PGT(t0) at time t0 to the breathing gas nitrogen partial pressure PIIG at the current water pressure.

The result is then stored as PGT(tE) in the tissue nitrogen partial pressure storage unit 65. The equation used for the calculation is shown below.

$$PGT(tE) = PGT(t0) + \{PIN2(t0) - PGT(t0)\} \times \{1 - \exp(-K(tE - t0)/HT)\}$$

where k is a constant determined by experiment.

The comparator 66 then compares the output PIN2(t) from the 63 and the output PGT(t) from the operating unit 5, and based on the result the tissue half-time selection unit 67 adjusts the tissue half-time TH used by the tissue nitrogen partial pressure calculation unit 64.

For example, if breathing gas nitrogen partial pressure PIN2(t0) and tissue nitrogen partial pressure PGT(t0) at time t=t0 are stored in the breathing gas nitrogen partial pressure storage unit 63 and tissue nitrogen partial pressure storage unit 65, respectively, the comparator 66 compares PIN2(t0) and PGT(t0).

The tissue nitrogen partial pressure calculation unit 64 is then controlled as follows by the tissue half-time selection unit 67 to calculate the tissue nitrogen partial pressure PGT (tE) at t=tE.

If $PGT(t0) > PIN2(t0)$, then $PGT(tE) =$ $$PGT(t0) + \{PIN2(t0) - PGT(t0)\} \times \{1 - \exp(-K(tE - t0)/HT1)\}$$

If $PGT(t0) < PIN2(t0)$, then $PGT(tE) =$ $$PGT(t0) + \{PIN2(t0) - PGT(t0)\} \times \{1 - \exp(-K(tE - t0)/HT2)\}$$

In these situations $HT2 < HT1$.

If $PGT(t0) = PIN2(t0)$, then $PGT(tE) = PGT(t0)$.

These times (measuring t0 and tE) are managed by the timekeeping unit 68 shown in FIG. 2.

If PGT(t0)>PIN2(t0), nitrogen is being eliminated from the tissues, and if PGT(t0)<PIN2(t0), nitrogen is being absorbed by the tissues. The tissue half-time is varied in these cases because when nitrogen is being eliminated the tissue half-time TH is long and more time is required for out-gassing, and when nitrogen is being absorbed, the tissue half-time is short and the time required for in-gassing is shorter than the time required for elimination. Varying the tissue half-time value therefore enables simulating the tissue nitrogen level more accurately. Therefore, by setting a threshold level for the tissue nitrogen partial pressure, the time required to reach the threshold level at a particular depth (water pressure) (no-decompression dive time/safety information) and the time required for the tissue nitrogen partial pressure to drop to the surface equilibrium level (tissue nitrogen elimination time/safety information) can be determined more accurately.

The dive computer 1 according to this embodiment of the invention thus has a diveable time derivation unit 92 and a nitrogen elimination time derivation unit 91 for deriving the no-decompression dive time and tissue nitrogen elimination time as diver safety information.

1.3 Arrangement for Determining the Start and End of a Dive

While diving the dive computer 1 measures water depth, water temperature, diving time, how much nitrogen has been absorbed by tissues while diving, and the diver's ascent speed, and drives the display and alarms based on these measurements. When a dive ends, these measurements and diving information such as whether any alarms were issued are saved in a diving log, and the log data can later be recalled and reviewed. This diving information is stored using the timekeeping unit 68, depth measuring unit 61, water entry monitoring switch 30, and some functions of the control unit 50 (CPU 51, ROM 53, and RAM 54 functions) shown in FIG. 2.

Figure 5:
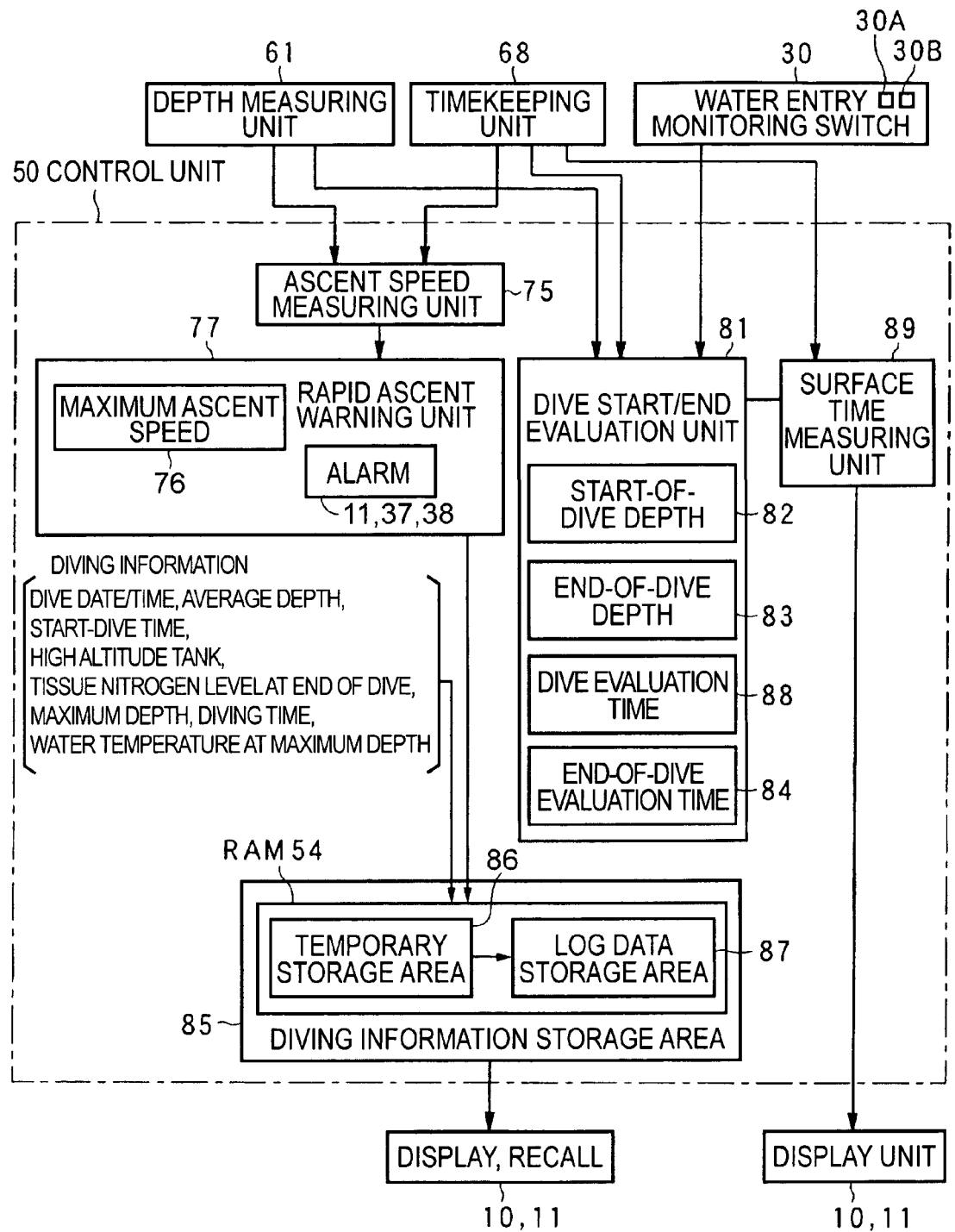
FIG. 5 is a function block diagram describing the arrangement for determining the start and end of a dive, rapid ascent alarm, and measuring the surface resting time.

More specifically, as shown in FIG. 5, the depth measuring unit 61, timekeeping unit 68, and water entry monitoring switch 30 of the dive computer 1 shown in FIG. 2 all output to the control unit 50, and the control unit 50 has a dive start/end evaluation unit 81 and a diving information storage area 85 that uses RAM 54 as memory. This arrangement is further described below with reference to FIG. 6.

The dive start/end evaluation unit 81 determines that a dive started if the water entry monitoring switch 30 detects at time T11 that the diver entered the water and at time T12 the diver has descended to a depth exceeding 1.5 meters, which is set as the start-of-dive depth 82. This starts measuring the diving time and other dive parameters. The diving information, including measured parameters such as the diving time, average depth, start-of-dive time, tissue nitrogen level while diving, maximum depth, diving time, and water temperature at maximum depth, as well as the diving date and time and altitude range, are updated in the diving information storage area 85 as necessary while diving while also being recorded to the temporary storage area 86 (temporary recording unit) rendered in RAM 54.

Based on output from the depth measuring unit 61 and timekeeping unit 68 after a dive starts, the dive start/end evaluation unit 81 does not decide that the dive has ended unless the diver has ascended at time T13 to a shallow depth above the 1.5 meter depth that is set as the end-of-dive depth 83 and remains above that depth for the end-of-dive evaluation time 84, which is set to 10 minutes in this embodiment of the invention.

As a result, if the diver ascends to a shallow depth above the 1.5 meter end-of-dive depth 83 at time T13 and then again descends to a depth below this 1.5 meter end-of-dive depth 83 at time T14 before the 10-minute end-of-dive evaluation time 84 has passed, the dive start/end evaluation unit 81 determines that the dive has not ended and the same dive is continuing.

Figure 6:
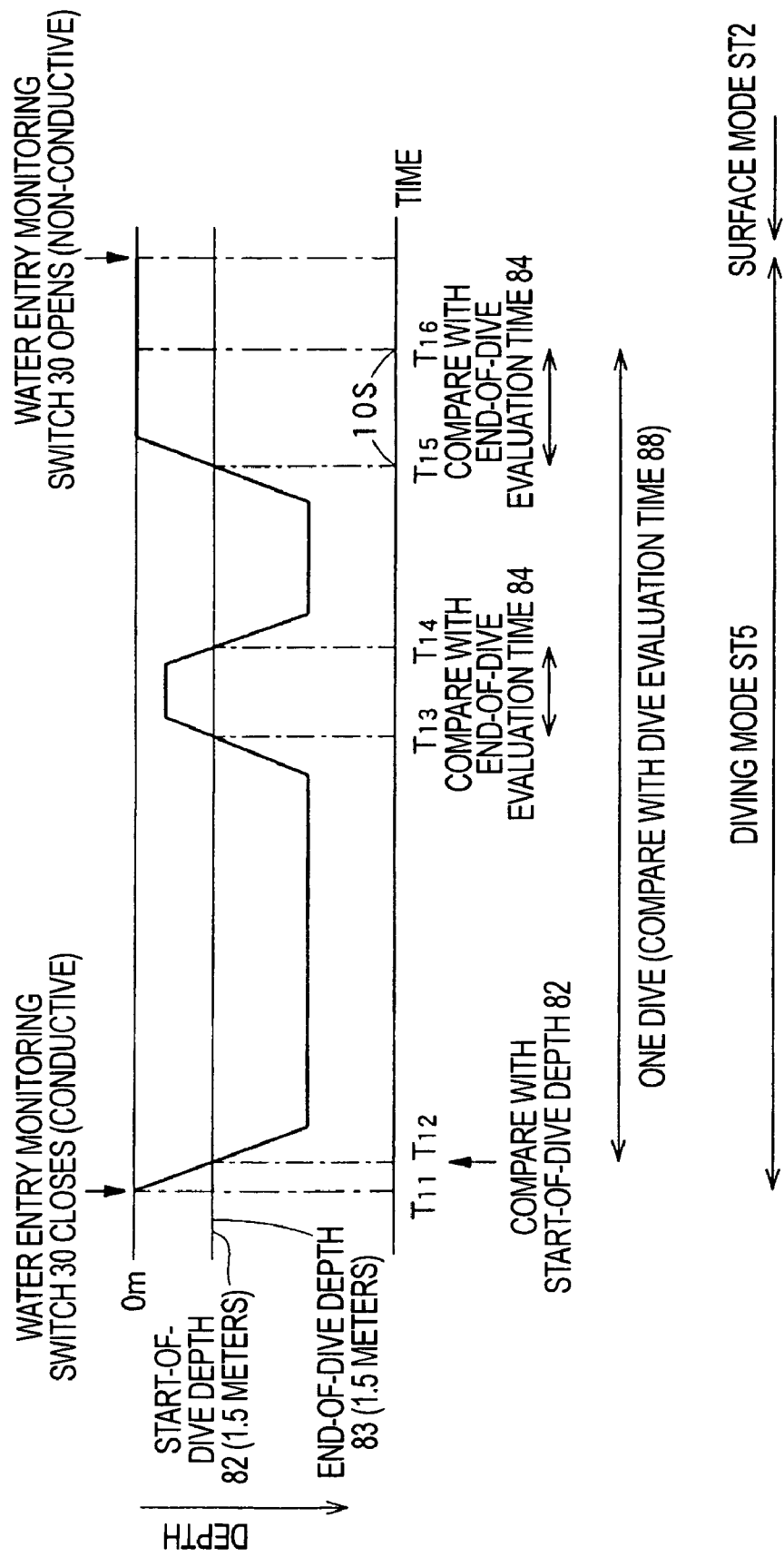
FIG. 6 describes the process for determining the beginning and end of a dive.

In the example shown in FIG. 6, the dive start/end evaluation unit 81 only decides that the dive has ended when the diver ascends at time T15 to the 1.5 meter end-of-dive depth 83 and then remains above that depth until time T16 10 minutes (the end-of-dive evaluation time 84) after time T15.

The current water depth, diving time, maximum depth, no-decompression dive time, tissue nitrogen level graph, altitude range, and other diving information that is essential to safe diving is displayed on the LCD panel 11 while diving, and continues to be displayed on the LCD panel 11 until the diver ascends to and remains for ten minutes (the end-of-dive evaluation time 84) at a shallower depth than the 1.5 meter end-of-dive depth 83. This is because if the diver ascends to a shallower depth than the 1.5 meter setting of the end-of-dive depth 83 at time T13 but then descends again to a depth deeper than the 1.5 meter setting of the end-of-dive depth 83 at time T14 before 10 minutes pass, the dive is not considered to have ended and the same dive continues.

Furthermore, if the diver ascends to a shallower depth than the 1.5 meter setting of the end-of-dive depth 83, remains above this depth for ten minutes (the end-of-dive evaluation time 84), and then gets out of the water, the same diving information remains displayed on the LCD panel 11 until the electrodes 30A and 30B are again isolated (the switch opens). More particularly, the diving mode remains active and the diving content continues to be displayed on the LCD panel 11 from when the dive computer 1 enters the water so that current flows between the electrodes 30A and 30B and the water entry monitoring switch 30 turns on until the diver gets out of the water, the electrodes 30A and 30B are again isolated, and the water entry monitoring switch 30 turns off.

This embodiment of the invention also enables using a particular switch operation to display the diving information stored in the temporary storage area 86 on the LCD panel 11 of the display unit 10 for the 10 minutes (end-of-dive evaluation time 84) from time T15 when the diver rises to the 1.5 meter end-of-dive depth 83 to time T16. This conveniently enables the diver to review and display the diving information for the current dive even before the diving information from the dive is saved as log data.

The dive computer 1 of this embodiment therefore recognizes as a single dive any time the diver rises to a shallow depth and then again descends to a deeper position, and does not erroneously treat such incidents as multiple dives. Dive information is therefore not recorded and read in small blocks, and the dive information can be recorded and reproduced in a format reflecting the actual dives. Irrelevant diving information from skin-diving, for example, can also be prevented from being recorded to the log data storage area 87.

The log data storage area 87 can also store log data for only a certain number of dives, such as a maximum of ten dives, and when more than this number of dives has been made, the log data is automatically deleted in order from the oldest log data. Furthermore, because a single dive may include multiple ascents to a shallow depth and descents to a deep diving depth, important log data is not accidentally updated and deleted. An arrangement in which particularly important log data cannot be updated or deleted is also possible.

Furthermore, if the time from time T12, when the diver descends below the 1.5 meter start-of-dive depth 82 after the water entry monitoring switch 30 detects that the diver entered the water at time T11 as a result of current passing between electrodes 30A and 30B, until time T15, when the diver ascends for the last time to a depth shallower than the 1.5 meter end-of-dive depth 83, is less than or equal to the 3 minute time set as the dive evaluation time 88, that is, if the dive takes less than three minutes, the diving information from the current dive is not recorded as log data in the log data storage area 87 because the time spent diving is no longer than when skin-diving.

Because unnecessary diving information is therefore not stored in the log data storage area 87, important log data will not be accidentally updated or deleted even if only log data for a maximum ten dives can be recorded in the log data storage area 87 and old data is automatically deleted in order from the oldest data when more dives are made.

1.4 Functional Arrangement for Deleting Erroneously Recognized Dives

While the general arrangement of the invention is described above, the dive computer 1 of this embodiment enters a surface mode ST2 while at rest after a dive ends. In this surface mode ST2 the air pressure measuring unit 69 regularly measures the air pressure, the altitude range evaluation unit 95 determines the altitude range in a group of predefined altitude ranges, the altitude range comparison unit 96 compares the current altitude range with the previous altitude range stored by the altitude range storage unit 97 in RAM 54 after the altitude was last determined, and starts calculating tissue absorption/elimination of nitrogen if there is a change in altitude range.

However, if the water entry monitoring switch 30 turns on and activates the depth measurement function when the user is out of the water and movement from a low pressure region to a high pressure region is detected, such as when moving from a high altitude to a low altitude, the start of a dive may be erroneously recognized. The continuously-open time of the water entry monitoring switch 30 is therefore measured, and if the water entry monitoring switch 30 is continuously open for longer than a predetermined time, the user is known to not be diving, the diving mode is therefore cancelled, and a mode for displaying the inert gas acclimatization state after a change in altitude while out of the water is enabled.

Therefore, if, for example, the user causes the water entry monitoring switch 30 to turn on by touching the water entry monitoring switch 30 with a wet finger while flying, and the cabin pressure of the airplane then changes so that the diving mode is indicated on the display unit, the diving mode is cancelled and the information that is normally displayed when not diving is displayed.

After the diving mode is thus cancelled, the dive computer 1 can immediately be used for diving when desired, and information reliability can be improved. When the diving status is cancelled in this situation, the operating mode is switched from the diving mode (depth measurement mode) to an operating mode other than the diving mode (the surface mode ST2 in this embodiment).

Figure 10:
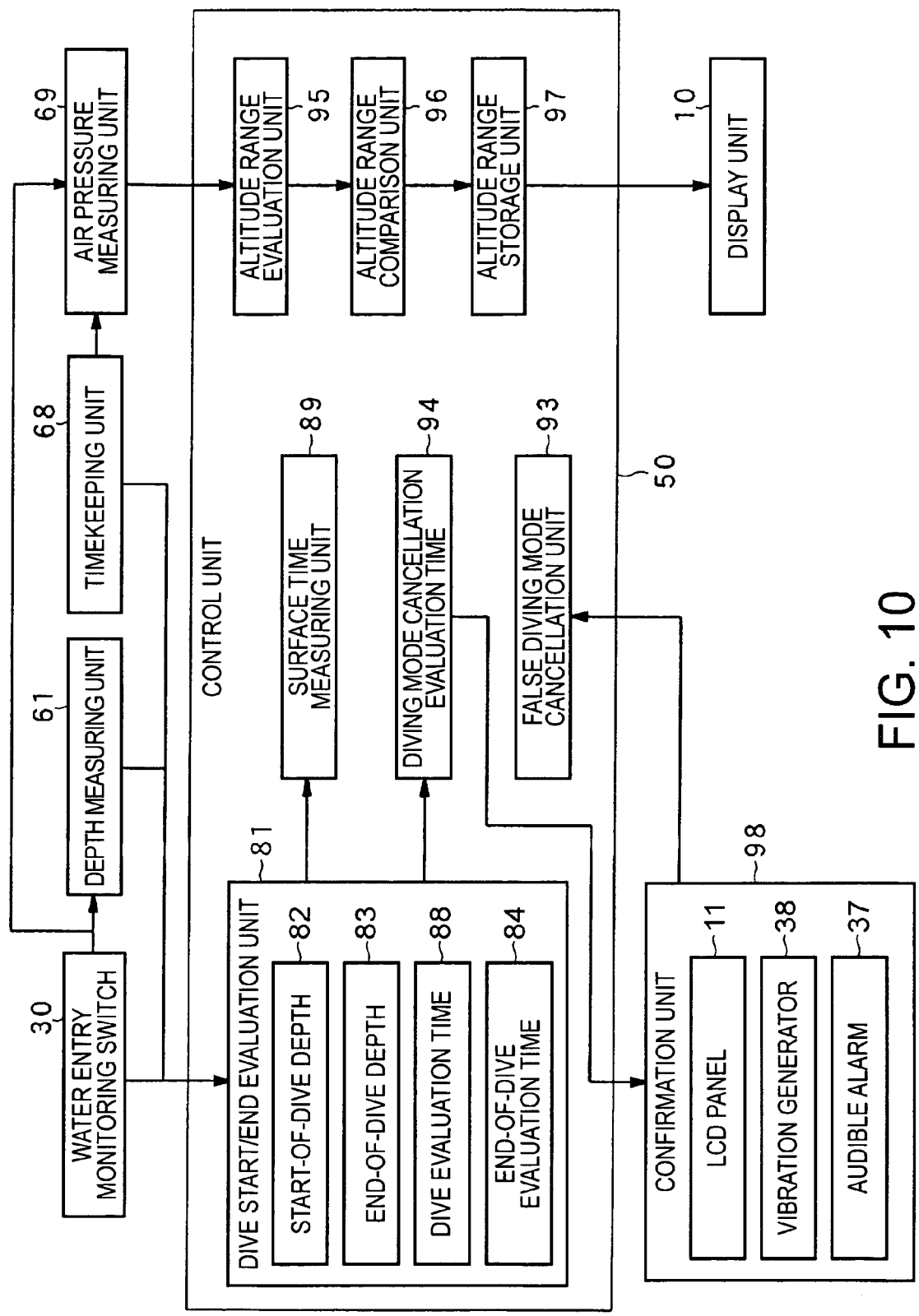
FIG. 10 is a block diagram of the arrangement for determining whether to cancel the diving mode.
Figure 11:
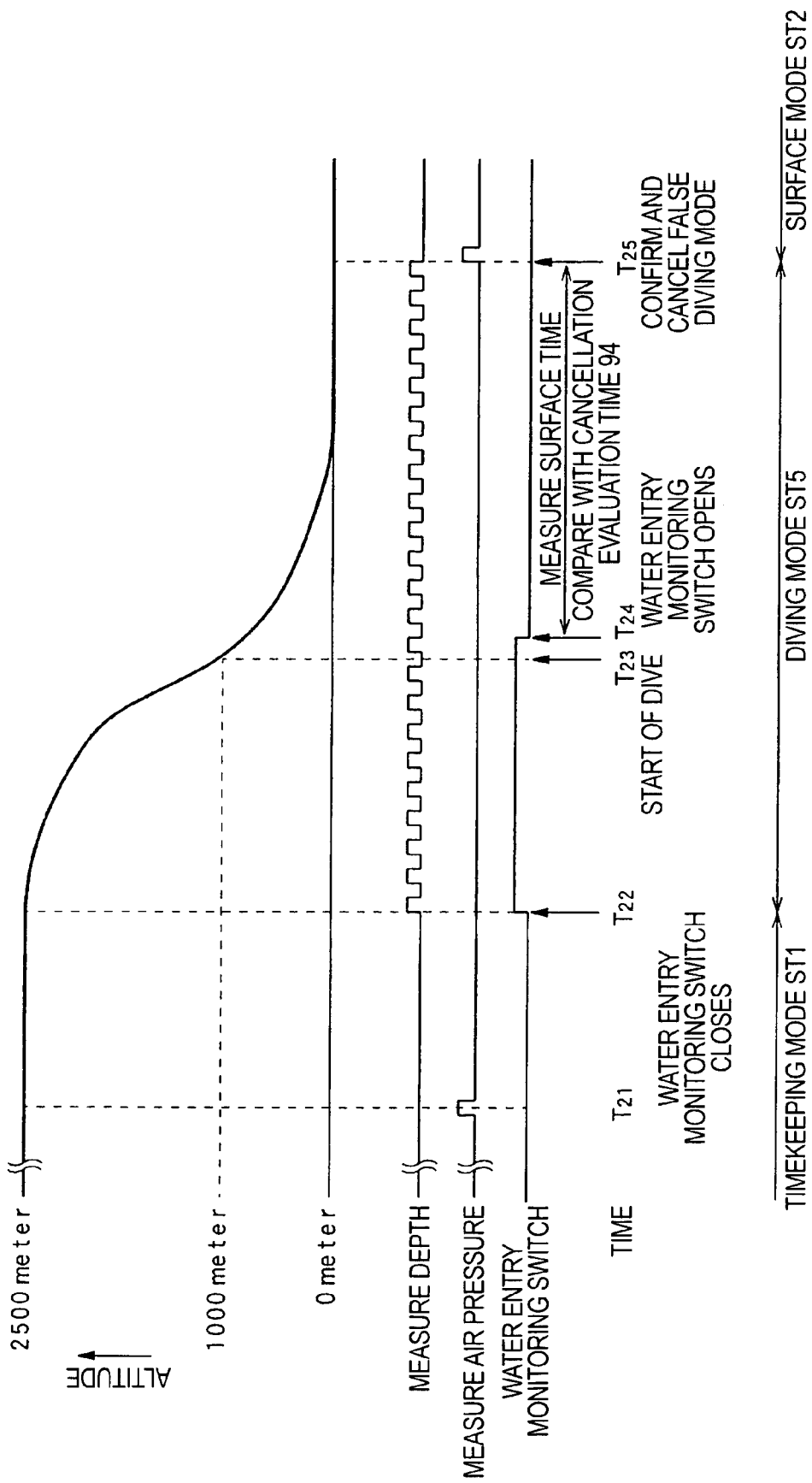
FIG. 11 describes the timing and content of the operation when the diving mode is enabled erroneously and the process for cancelling the diving mode.

A severe example of a pressure change in this scenario is when the user is flying and the airplane changes altitude. Sudden pressure changes when flying and the arrangement of the invention whereby such operating errors are cancelled is further described below with reference to FIG. 10 and FIG. 11.

At time T21 the air pressure measuring unit 69 measures the air pressure which the altitude range storage unit 97 stores as an altitude range in RAM 54.

At time T22 the water entry monitoring switch 30 turns on as a result of being touched with a wet hand, for example, and the depth measuring unit 61 starts measuring the water depth. If the airplane then descends 1500 meters or more, for example, the air pressure rises relative to the air pressure before the descent. This air pressure difference is equivalent to a water pressure change of approximately 1.5 meters, and at time T23 the dive start/end evaluation unit 81 erroneously decides that a dive has started as a result of comparing this air pressure difference with 1.5 meters (the start-of-dive depth 82).

At time T24 the water entry monitoring switch 30 again opens, but the diving mode ST5 continues because the user was determined at time T23 to be diving, and the depth measuring unit 61 continues to measure water depth.

This embodiment of the invention also does not reset the depth measuring unit 61 (the offset of the depth measuring unit 61) when the diving mode is cancelled, and instead measures the offset at a predetermined time.

When the water entry monitoring switch 30 is open (not in the water) because the diver is on land and not in the water, the depth measuring unit 61 measures air pressure (altitude) instead of water pressure at a predetermined interval.

If this predetermined interval is 10 minutes, for example, the air pressure and the sea level reference pressure (=atmospheric reference pressure) are measured once every 10 minutes.

Because measuring the air pressure for the sole purpose of cancelling an erroneous diving mode requires a special evaluation process, the air pressure is preferably always measured at the same timing for resetting the depth measuring unit 61 so that special software processing can be avoided. This embodiment of the invention therefore does not reset the depth measuring unit 61 when the diving status is cancelled, and instead resets the depth measuring unit 61 when measuring the air pressure every 10 minutes.

When the water entry monitoring switch 30 opens (detects an in-air condition) at time T24, the cancellation unit 93 starts measuring the time that the water entry monitoring switch 30 is open as the surface time by means of the surface time measuring unit 89.

At a predetermined interval the control unit 50 compares the surface time with the cancellation evaluation time 94 used as the reset standby time (10 minutes in this embodiment of the invention), and if the surface time is greater than or equal to the cancellation evaluation time 94 determines that the diving status of the diving mode ST5 is the result of erroneously recognizing diving conditions.

The control unit 50 therefore displays a confirmation screen asking the user to confirm whether the diving mode should be cancelled on a confirmation unit 98 rendered by the LCD panel 11 of the display unit 10. To inform the user of the error, the control unit 50 causes the vibration generator 38 to vibrate and causes the audible alarm to sound a warning.

The user then cancels the erroneous diving mode using the operating unit 5 that functions as a false diving mode cancellation unit 93.

One method of cancelling the false diving mode is to require that both button switch A and button switch B are simultaneously depressed and held depressed for a predetermined time.

This also enables the user to quickly and easily cancel a diving mode if the user notices that the dive computer 1 is operating in the diving mode when not diving, and thus also improves ease of use.

This is also quite practical during the manufacturing process because the diving mode can be cancelled by a particular operation so that the dive computer can be quickly and efficiently passed to the next step if the diving mode is erroneously activated during the manufacturing process when subjected to a quality assurance check in a low pressure environment created by a pressure adjustment system. Note that a low pressure environment denotes a condition in which the pressure is lower than atmospheric pressure at sea level (0 meter altitude) and is the air pressure at an altitude at which people can carry on with their daily life (that is, to an altitude of approximately 2000 meters).

The control unit 50 thus cancels the erroneous diving mode and switches from the operating mode when diving to an operating mode used when not diving, such as the surface mode ST2, and presents a corresponding screen on the display panel.

More specifically, if the dive start/end evaluation unit 81 determines that a dive has started after the water entry monitoring switch 30 becomes conductive but at time T25 the time that the water entry monitoring switch 30 is continuously open (non-conductive) is greater than or equal to the cancellation evaluation time 94 (=10 minutes), the control unit 50 prompts the user to confirm whether to cancel the erroneous diving mode.

If the user then confirms cancelling the diving mode, the audible alarm 37 is driven to sound and the vibration generator 38 is driven to vibrate to inform the diver that the operating mode was changed from the diving mode to the surface mode. The display unit 10 could also be caused to flash by driving a light-emitting diode, for example. The user is thus reliably informed that the erroneous diving mode was cancelled and the information displayed on the display panel 11 was updated.

This operation eliminates automatically changing the operating mode without user intervention when the diving mode is erroneously activated, and thus improves the reliability of the collected information.

Situations such as the user being unable to get information that is displayed in the surface mode because the display is set to the diving mode when getting off an airplane are also prevented. In addition, changes in pressure on the body can also be shown on the display unit and the information can be displayed until the level of inert gases in the diver's tissues returns to equilibrium.

The cancellation evaluation time 94 is the same as the diving information storage area 85, that is, 10 minutes, in this embodiment of the invention to make the ROM 53 and CPU 51 of the control unit 50 more efficient, but the time to the cancellation operation can be a shorter time, such as the same as the dive evaluation time 88.

Furthermore, at time T25 when the surface mode ST2 that is displayed when not diving is activated because the user cancelled a false diving mode using the false diving mode cancellation unit 93, the air pressure measuring unit 69 starts measuring air pressure and the altitude range comparison unit 96 compares the altitude range detected by the altitude range evaluation unit 95 with the altitude range that was previously measured and identified the previous time T21 to determine if there was a change to a lower altitude range. As a result, the surface mode ST2 that shows that tissue in/out-gassing is being calculated is activated instead of simply displaying the time because there was a change in altitude.

More specifically, the information displayed on the LCD panel 11 while mistakenly operating in the diving mode is the information that is displayed when in the water. However, because the ambient pressure (air pressure) is measured continuously and tissue in/out-gassing based on the detected pressure is continuously calculated while in this diving mode, and tissue in/out-gassing calculation continues and the change in the level of inert gases in body tissues is displayed in the surface mode ST2 that is activated after the diving mode is cancelled, the actual changes occurring in the tissues can be simulated more precisely and this information can be provided for the user. The safety of subsequent dives can therefore be improved and the reliability of the information displayed when the diver returns to a normal condition can be improved.

1.5 Ascent Speed Monitoring Function

The dive computer 1 monitors the diver's speed of ascent during the diving mode described below, and this monitoring function is rendered using the functions of, for example, the CPU 51, ROM 53, and RAM 54.

More specifically, the dive computer 1 has an ascent speed measuring unit 75 and rapid ascent warning unit 77 as shown in FIG. 5.

The ascent speed measuring unit 75 measures the rate of ascent when the diver is rising based on output from the timekeeping unit 68 and output from the depth measuring unit 61.

The rapid ascent warning unit 77 compares the output from the ascent speed measuring unit 75 with a predetermined maximum ascent speed 76, and if the current rate of ascent exceeds the maximum ascent speed 76, issues a warning that the diver is rising too rapidly.

The ascent speed measuring unit 75 is rendered as a computing function of the CPU 51, ROM 53, and RAM 54 shown in FIG. 2. The rapid ascent warning unit 77 is rendered as a function of the CPU 51, ROM 53, RAM 54, audible alarm 37, vibration generator 38, and LCD panel 11 shown in FIG. 2.

In this embodiment of the invention the rapid ascent warning unit 77 compares the maximum ascent speed stored for each depth range in the ROM 53 as the maximum ascent speed 76 with the current rate of ascent. If the current rate of ascent is faster than the maximum ascent speed 76 for the current depth, the rapid ascent warning unit 77 issues a rapid ascent warning using the LCD panel 11, or by causing the audible alarm 37 to sound an alarm, or by causing the vibration generator 38 to vibrate, for example. When the rate of ascent returns below the maximum ascent speed 76, the rapid ascent warning is stopped.

The rapid ascent warning unit 77 issues no rapid ascent warning at depths of less than 1.8 meters. At greater depths, the following values are set as the maximum ascent speed 76 at specific depth ranges:

8 m/min (approximately 0.8 m/6 sec) from 1.8 m to 5.9 m;

12 m/min (approximately 1.2 m/6 sec) from 6.0 m to 17.9 m;

16 m/min (approximately 1.6 m/6 sec) at depths of 18.0 m/min and greater.

More specifically, decompression sickness can be sufficiently prevented even if a relatively rapid rate of ascent is allowed at deeper depths because the change in water pressure per unit of time before and after ascent decreases as depth increases even if the rate of ascent is the same. On the other hand, only a relatively slow rate of ascent is allowed in shallow water because the change in water pressure before and after ascent is great per unit of time when rising at the same speed.

Figure 7:
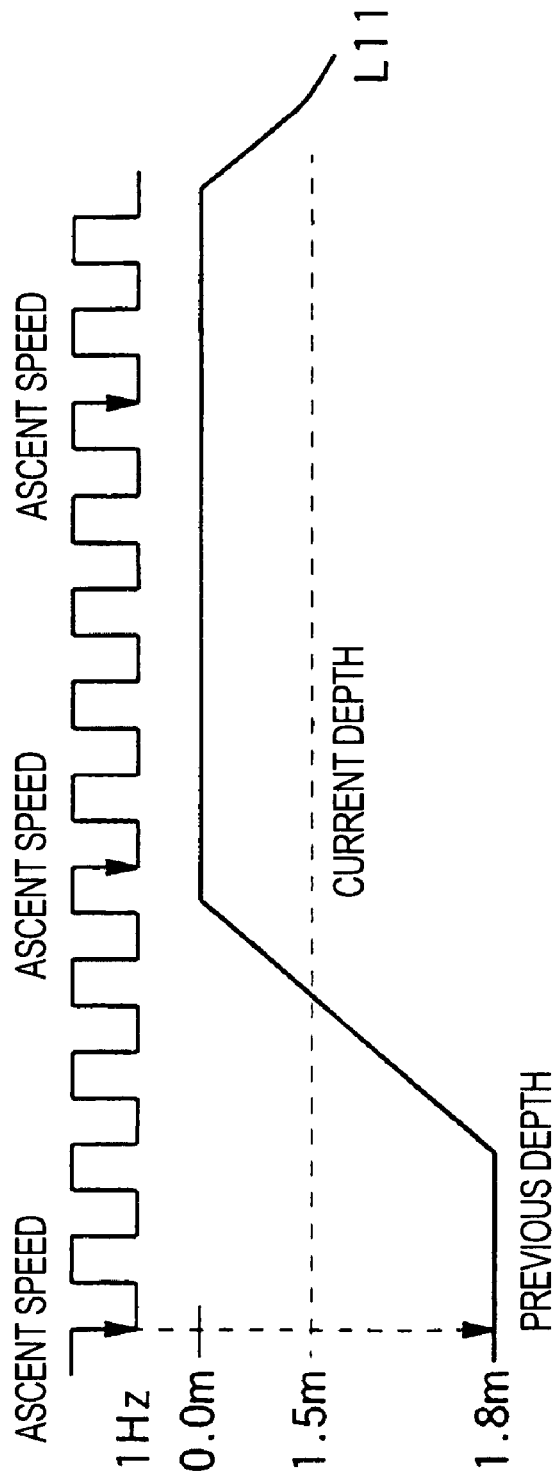
FIG. 7 describes the timing for measuring ascent speed and why the rapid ascent alarm is not emitted at shallow depths.

As shown in FIG. 7 depth is measured every second, but in order to prevent movement of the arm on which the dive computer 1 is worn from affecting the measured rate of ascent, the ascent speed is measured every six seconds, the difference between the current depth and the depth measured six seconds earlier is calculated, and this difference is used as the rate of ascent that is compared with the maximum ascent speed (meters/6 seconds) as described above. The maximum rate of ascent is therefore stored in ROM 53 in terms of the depth per 6-seconds.

The dive computer 1 according to this embodiment also has a diving information storage area 85 that stores the diving information (data such as the dive date, diving time, and maximum dive depth) in a log data storage area 87 in RAM 54. The diving information storage area 85 also stores as part of the log data in the log data storage area 87 whether a rate of ascent violation occurred during the dive. This enables later recalling and displaying on the LCD panel 11 whether the maximum rate of ascent was exceeded during the current dive. However, the diving information storage area 85 only stores a rate of ascent violation as part of the dive log data in the log data storage area 87 if a rapid ascent warning was issued twice consecutively during the same dive. A rate of ascent violation is therefore not stored in the log if movement of the diver's arm causes a fast rate of ascent to be mistakenly calculated.

Furthermore, because the dive computer 1 of this embodiment only determines that a dive is in progress if the depth remains greater than 1.5 meters for more than three minutes, the depth is treated and displayed as 0 meters when the diver rises to a shallower depth than 1.5 meters. Therefore, if the rapid ascent warning unit 77 issues a rapid ascent warning at such shallow depths in the same way as at greater depths, a rapid ascent warning will be issued even though the diver is rising at the required rate of ascent if the arm moves only a few centimeters between a depth slightly greater than 1.5 meters and a depth only slightly shallower than 1.5 meters, which is treated as 0 meters. This will cause the diver to doubt the reliability of the rapid ascent warning. To avoid this, this embodiment of the invention does not issue a rapid ascent warning when the current water depth is shallower than a predetermined level (1.5 meters) regardless of how fast the diver is rising. The rapid ascent warning is therefore more reliable because such unnatural warnings are not issued. More specifically, rapid ascent warnings are not issued when, as shown in FIG. 7, the previous water depth measured while ascending is 1.8 meters, the diver continues to ascend from this position as indicated by the solid line L11, and the current water depth measured 6 seconds later is less than or equal to 1.5 meters (the end-of-dive depth).

1.6 Surface Time Measurement Function

As described above excessive nitrogen accumulates in the diver's tissues while diving, and a rapid ascent can cause nitrogen in the tissues to bubble, resulting in decompression sickness. Furthermore, if the diver boards a plane after diving and moves to a high altitude while such supersaturated nitrogen remains in the tissues, the rapid drop in air pressure can again cause the tissue nitrogen to bubble and decompression sickness results. As a result, a diver should wait 24 hours, and preferably 48 hours, after diving before boarding an airplane.

As shown in FIG. 5 the dive computer 1 according to this embodiment of the invention therefore has a surface time measuring unit 89 that measures how much time has passed since the dive ended as the surface time based on the output from the depth measuring unit 61 and output from the timekeeping unit 68. More specifically, the surface time measured by the surface time measuring unit 89 is how much time has passed since the dive start/end evaluation unit 81 determines that a dive ended based on the output from the depth measuring unit 61 and the output from the timekeeping unit 68.

By displaying the surface time measured by the surface time measuring unit 89 after a dive ends on the LCD panel 11, the diver can therefore be warned to wait enough time for excess nitrogen to be eliminated from the tissues before boarding an airplane.

1.7 Operating Mode Descriptions

The dive computer 1 of the invention can be used in the various modes described below with reference to FIG. 8. These modes are the standard timekeeping mode ST1, surface mode ST2, planning mode ST3, set-up mode ST4, diving mode ST5, and log mode ST6.

1.7.1 Timekeeping Mode ST1

The timekeeping mode ST1 is the operating function when no switches are operated, the tissue nitrogen level is in equilibrium, and the dive computer 1 is worn on land. The current date 100, the current time 101, and the altitude range 103 (see FIG. 1; the altitude indicator is not displayed when the altitude range is 0) are displayed on the LCD panel 11 in the timekeeping mode ST1. The altitude of the current location is measured automatically and the altitude range 103 is displayed as one of three levels. A colon flashes in the current time 101 to indicate that the current time 101 is displayed. In the example shown in FIG. 8 the current date is therefore December 5 and the current time is 10:06.

Furthermore, because air pressure changes when moving between high and low altitude locations, tissue in/out-gassing occurs regardless of any past diving experience. The dive computer 1 according to this embodiment of the invention therefore automatically starts the decompression calculation and displays the result when such change in altitude is detected even when the timekeeping mode ST1 is active. Although not shown in the figure, the time passed since the altitude change, the time for the tissue nitrogen level to reach equilibrium, and the amount of nitrogen eliminated or absorbed between now and equilibrium is restored are therefore displayed.

Pressing switch B moves directly to the log mode ST6. Pressing switch A and then pressing and holding switch B depressed for 5 seconds while switch A remains depressed moves to the set-up mode ST4.

A function check is automatically run if the water entry monitoring switch 30 shown in FIG. 1 and FIG. 2 detects water entry while in the timekeeping mode ST1. If the sensors are confirmed to be functioning normally, the diving mode ST5 is automatically activated. If a problem with a sensor, for example, is detected, the audible alarm 37 shown in FIG. 2 is driven to issue an alarm.

During this timekeeping mode ST1 (surface mode ST2) the dive computer 1 automatically enters the surface mode ST2 if the closed water entry monitoring switch 30 opens after diving has ended.

1.7.2 Surface Mode ST2

The surface mode ST2 is the operating mode for 48 hours after the last dive when the dive computer 1 is worn on land.

In addition to the data (current date 100, current time 101, altitude range 103) displayed in the timekeeping mode ST1, the surface mode ST2 also displays an index to the change in tissue nitrogen after a dive ends. More specifically, the time required for tissues to out-gas excess absorbed nitrogen and return to equilibrium is displayed as the nitrogen elimination time 201. The nitrogen elimination time 201 counts down the time to equilibrium. The display goes blank when the nitrogen elimination time 201 reaches 0 hrs 00 minutes.

The time passed since the dive ended is displayed as the surface time 202. Measuring the surface time 202 starts from when the dive ends, which is defined as when the depth becomes shallower than 1.5 meters for the last time in the diving mode ST5, and displaying the surface time 202 stops when 48 hours have passed since the dive ended. The dive computer 1 therefore stays in this surface mode ST2 until 48 hours pass after a dive ends, and then enters the timekeeping mode ST1.

Figure 8:
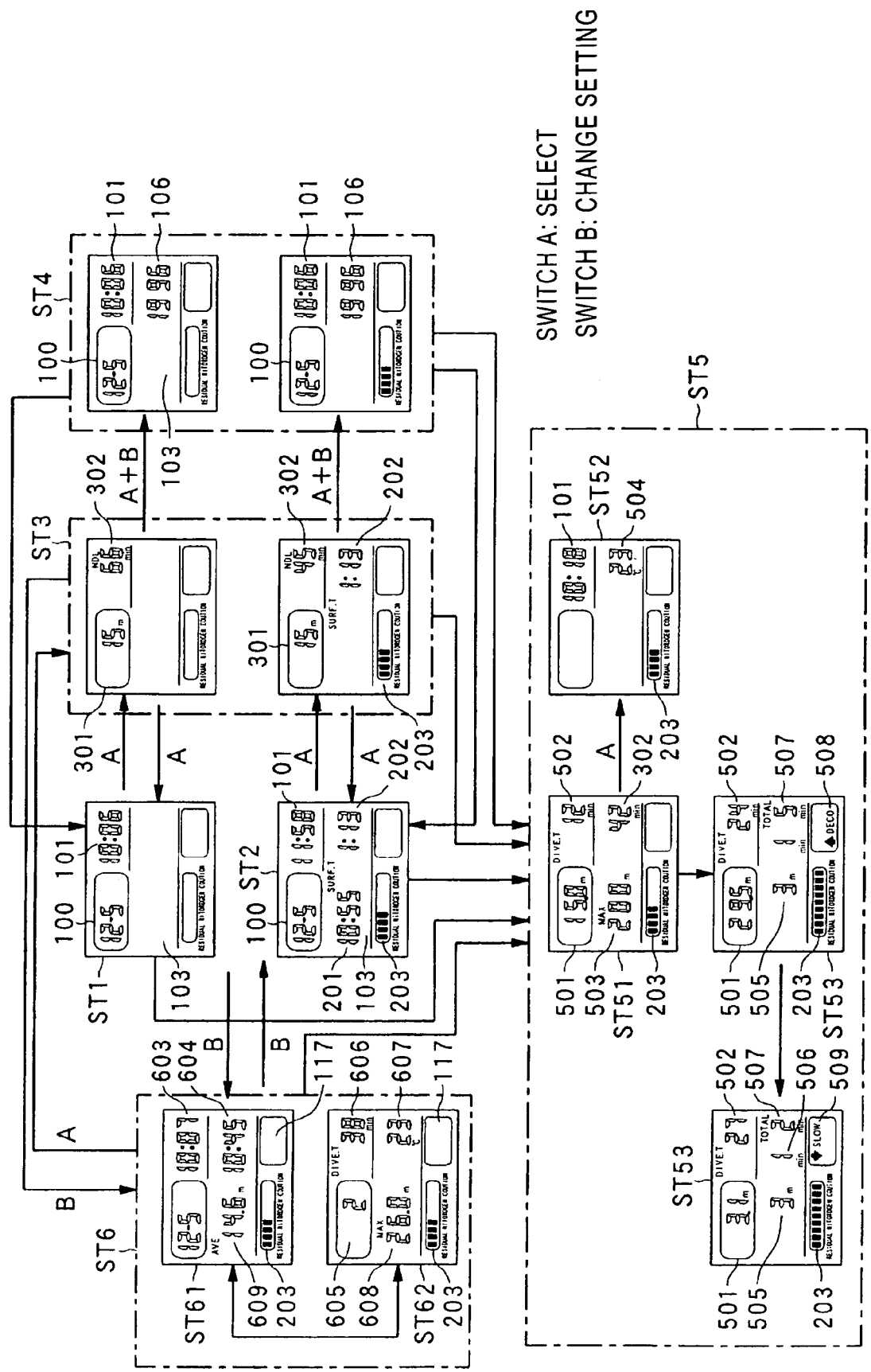
FIG. 8 is a flow chart of the different operating modes.
Figure 9:
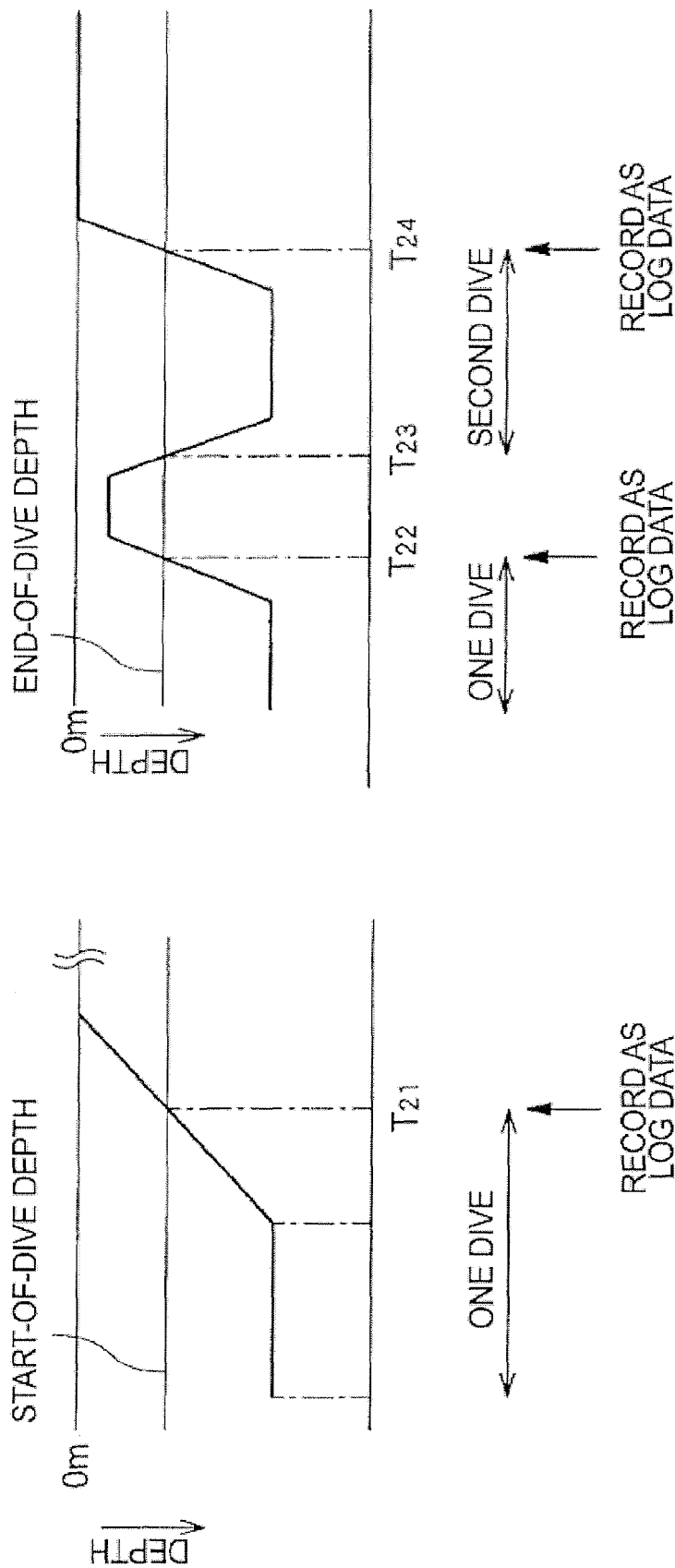
FIG. 9A and 9B describes a prior art process for determining the beginning and end of a dive (please refer to JP 2003-118690, FIG. 9).

The example in FIG. 8 shows that it is currently 11:58 on December 5 and that 1 hour and 13 minutes have passed since the dive ended. The residual tissue nitrogen level after diving is equivalent to four bars in the residual nitrogen graph 203, and the time left for tissues to eliminate excess nitrogen and return to equilibrium (the nitrogen elimination time 201) is 10 hours and 55 minutes.

Pressing switch A in the surface mode ST2 goes directly to the planning mode ST3, and pressing switch B goes directly to the log mode ST6. Pressing switch A and then pressing and holding switch B depressed for 5 seconds while switch A remains depressed moves to the set-up mode ST4.

A function check is automatically run if the water entry monitoring switch 30 detects water entry while in the surface mode ST2. If the sensors are confirmed to be functioning normally, the diving mode ST5 is automatically activated. If a problem with a sensor, for example, is detected, the audible alarm 37 is driven to issue an alarm.

1.7.3 Planning Mode ST3

The planning mode ST3 is the mode for entering settings for the maximum depth and diving time for the next dive.

The depth level 301, no-decompression dive time 302, safety level, altitude range, surface time 202, and residual nitrogen graph 203 are displayed in the planning mode ST3.

The depth level 301 changes sequentially from low to high, and the no-decompression dive time 302 at each depth level 301 is displayed. The depth level 301 changes every five seconds in the order 9 m, 12 m, 15 m, 18 m, 21 m, 24 m, 27 m, 30 m, 33 m, 36 m, 39 m, 42 m, 45 m, and 48 m. If the planning mode ST3 is entered from the timekeeping mode ST1, the first dive is being planned with no residual tissue nitrogen from a previous dive, the residual nitrogen graph 203 therefore indicates 0, and the no-decompression dive time 302 at a depth of 15 meters is shown to be 66 minutes. It is also known that a no-decompression dive is possible for less than 66 minutes at a depth between 12 meters and 15 meters.

If the planning mode ST3 is entered from the surface mode ST2, a repeat dive is being planned while excess tissue nitrogen remains from a previous dive. In this example, four segments are displayed in the residual nitrogen graph 203 and the no-decompression dive time 302 is 49 minutes to a maximum depth of 15 meters. The display also shows that a no-decompression dive is possible for less than 49 minutes at a depth between 12 meters and 15 meters.

Holding switch A depressed in the planning mode ST3 for more than 2 seconds before the depth level 301 indicates 48 meters goes directly to the surface mode ST2. After the depth level 301 indicates 48 meters, pressing switch A goes automatically either to the timekeeping mode ST1 or surface mode ST2. Furthermore, the surface mode ST2 or timekeeping mode ST1 is also entered automatically if no switches are operated for a predetermined time, which is also convenient because no user operation is required to enter either mode. Pressing switch B, on the other hand, goes directly to the log mode ST6.

A function check is automatically run if the water entry monitoring switch 30 detects water entry while in the planning mode ST3. If the sensors are confirmed to be functioning normally, the diving mode ST5 is automatically activated. If a problem with a sensor, for example, is detected, the audible alarm 37 is driven to issue an alarm.

1.7.4 Set-Up Mode ST4

The set-up mode ST4 is the mode for setting the current date 100, the current time 101, turning the warning alarm on/off, and setting the safety level. The current date 100, year 106, current time 101, safety level (not shown in the figure), whether the alarm is on or off (not shown in the figure), and the altitude range 103 are displayed in the set-up mode ST4.

The safety level can be set to either of two levels, the standard decompression calculation level, and a level for calculating the decompression level assuming the diver moved to an altitude range one level up after the last dive.

The alarm on/off setting enables setting whether the audible alarm 37 issues the different alarms. If set to off, no alarm is issued. Battery life is a fatal consideration for a dive computer 1, and this function is convenient because it reduces power consumption by the alarm.

Pressing switch A when in the set-up mode ST4 changes the configurable setting in the order hour, minute, second, year, month, day, safety level, and alarm on/off status, and the selected setting blinks in the display. Then pressing switch B changes the numeric or text value of the setting, and holding switch B depressed causes the value to change quickly.

Pressing switch A when the alarm on/off setting is flashing returns to the surface mode ST2 or timekeeping mode ST1. Holding both switch A or switch B depressed for one to two minutes returns automatically to the surface mode ST2 or timekeeping mode ST1.

A function check is automatically run if the water entry monitoring switch 30 detects water entry while in the set-up mode ST4. If the sensors are confirmed to be functioning normally, the diving mode ST5 is automatically activated. If a problem with a sensor, for example, is detected, the audible alarm 37 is driven to issue an alarm.

1.7.5 Diving Mode ST5

The diving mode ST5 is the operating mode when diving, and includes a no-decompression dive mode ST51, a current time display mode ST52, and a decompression dive mode ST53.

The no-decompression dive mode ST51 displays essential diving information such as the current depth 501, dive time 502, maximum depth 503, no-decompression dive time 302, residual nitrogen graph 203, and altitude range. The example in FIG. 8 shows that 12 minutes have passed since the dive started, the current depth is 16.8 meters, and diving at that depth can continue for 42 minutes without requiring decompression. The maximum depth reached so far on the dive was 20.0 meters, and the current tissue nitrogen level is equivalent to four bars on the residual nitrogen graph 203.

The current depth 501 can be driven to flash in order to tell the diver that the diving mode ST5 is active. The diver can thus know from the LCD panel 11 that the processes executed in the diving mode ST5 are running, and the diver does not need to worry if the diving mode ST5 is functioning properly or not.

As described above in the ascent speed monitoring function, a rapid ascent can lead to decompression sickness. The diving mode ST5 therefore determines the current rate of ascent every six seconds, and compares this ascent speed with the rate of ascent allowed for the current depth.

If the current rate of ascent is faster than the allowed ascent speed, the audible alarm 37 issues a 4-kHz alarm (rapid ascent warning) for three seconds. Together with this audible alarm SLOW and the current depth are alternately displayed in the LCD panel 11 at a 1-Hz interval to tell the diver to slow the ascent and warn the diver of too-rapid ascent. This rapid ascent warning is stopped when the rate of ascent drops to the normal level.

Pressing switch A in the diving mode ST5 causes the current time 101 and current water temperature 504 to be displayed as the current time display mode ST52 for as long as the switch is held depressed. The example in FIG. 8 shows that the time is currently 10:18 and the water temperature is 23° C. By thus displaying the current time 101 and current temperature for a specific time when a particular switch is operated in the diving mode ST5, the current time display mode ST52 can be easily called to display the current time 101 and other information as needed in the no-decompression dive mode ST51 even if the display is configured to normally present only the data required for diving in a small display area. The diver can also display the desired information as needed in the diving mode ST5 because a simple switch operation is used to change the display content.

If the depth becomes shallower than 1.5 meters when in the diving mode ST5, the end-of-dive process is executed and the surface mode ST2 is then automatically activated when the conductive water entry monitoring switch 30 becomes nonconductive. The diving information storage area 85 shown in FIG. 5 also stores and saves the diving information (the dive date, diving time, maximum depth, and other information) for the single dive from when the depth exceeded 1.5 meters to when the depth became shallower than 1.5 meters for the last time in the diving information storage area 85 (RAM 54). If a rapid ascent warning was issued twice consecutively during the current dive, that a rapid ascent warning was issued is also recorded in the diving information.

The dive computer 1 of this embodiment assumes that most dives will be no-decompression dives, but if a decompression dive state is detected an alarm is sounded to inform the diver and operation switches to the decompression dive mode ST53 described below.

The current depth 501, dive time 502, residual nitrogen graph 203, altitude range, decompression stop depth 505, decompression stop time 506, and total ascent time 507 are displayed in the decompression dive mode ST53. The example in FIG. 8 shows that 24 minutes have passed since the dive started, and the current depth is 29.5 meters. Because the tissue nitrogen level exceeds the maximum limit for a no-decompression dive and ascending without decompression is dangerous, the diver is instructed to ascend to 3 meters at a safe speed and then stop at that depth for 1 minute.

The display also shows that at least 5 minutes are required to rise to the surface at a safe rate of ascent. An upward pointing arrow 508 also indicates that the tissue nitrogen level is currently trending upward, indicating inert gas absorption.

While the diver then continues ascending after a decompression stop as indicated by the display, a downward pointing arrow 509 indicates that the tissue nitrogen level is decreasing during the decompression stop, indicating inert gas elimination.

1.7.6 Log Mode ST6

Pressing switch B in the timekeeping mode ST1 or surface mode ST2 moves directly to the log mode ST6. The log mode ST6 is a function for displaying and reproducing the diving information stored by the diving information storage area 85 in the log data storage area 87 when the diving mode ST5 remains active for at least 3 minutes with the diver at a depth below 1.5 meters. This diving data is sequentially stored as log data after each dive, and dive data for a maximum ten dives can be stored. When more dives are made, the oldest dive record is deleted to store data for the most recent dive so that data for the most recent ten dives is always stored.

The log data is displayed in the log mode ST6 by switching between two screens every four seconds. The first screen ST61 displays the dive date 601, average depth 609, dive start time 603, dive end time 604, altitude range, and the residual nitrogen graph 203 at the time when the dive ended.

The second screen ST62 displays the log number 605, which is the number of the dive on that day, the maximum depth 608, diving time 606, water temperature 607 at the maximum depth, altitude range, and the residual nitrogen graph 203 at the time when the dive ended.

The example in FIG. 8 shows that the second dive on December 5 in a location at an altitude range of 0 started at 10:07, ended at 10:45, and lasted 38 minutes. In addition, the average depth on the dive was 14.6 meters, the maximum depth was 26.0 meters, the water temperature at the maximum depth was 23° C., and when the dive ended tissue absorption of nitrogen was equivalent to four bars on the residual nitrogen graph 203. By thus switching automatically between two screens in the log mode ST6 to display different data, a large amount of information can be displayed even on a small screen.

Furthermore, the log mode ST6 also indicates if a rapid ascent warning was issued twice during the dive for which diving information is presented by displaying SLOW in the seventh display area 117 of the LCD panel 11, for example.

Pressing switch B in the log mode ST6 sequentially displays the dive log from the most recent to the oldest dive record, and then switches to the timekeeping mode ST1 or surface mode ST2 after displaying the oldest dive information. Pressing switch B for more than two seconds in the log mode ST6 switches to the timekeeping mode ST1 or surface mode ST2. If neither switch A or switch B is pressed for a period of one to two minutes, operation returns automatically to the surface mode ST2 or timekeeping mode ST1, thus conveniently exiting the log mode ST6 without requiring user intervention.

Pressing switch A moves directly to the planning mode ST3. This embodiment of the invention thus enables moving directly between the planning mode ST3, surface mode ST2, and log mode ST6 by pressing a single switch. Because there are various routes for switching the operating mode and only a single switch is required to shift directly between the planning mode ST3 and log mode ST6, it is simple and convenient to plan the next dive while referring to past dive records.

A function check is automatically run if the water entry monitoring switch 30 detects water entry while in the log mode ST6. If the sensors are confirmed to be functioning normally, the diving mode ST5 is automatically activated. If a problem with a sensor, for example, is detected, the audible alarm 37 is driven to issue an alarm.

A new dive can therefore conveniently start soon after confirming the previous dive log in the log mode ST6 or setting a dive plan in the planning mode ST3 because the diving mode ST5 can be entered automatically from the planning mode ST3, surface mode ST2 (timekeeping mode ST1), log mode ST6, and set-up mode ST4. Furthermore, because the diving mode ST5 is automatically entered when the water entry monitoring switch 30 detects water entry in any other mode, manual intervention is not required to switch to the diving mode.

More particularly, ease of use is improved because problems such as only learning after the dive started that entering the diving mode ST5 failed because preparations for entering the diving mode ST5 were not completed are eliminated.

Furthermore, executing a function check when entering the diving mode ST5 and automatically blocking the diving mode ST5 and issuing an alarm if a problem is detected in the function check prevents problems caused by enabling the diving mode ST5 when there is a problem, informs the diver that a problem exists, and is therefore convenient. Failure to monitor tissue absorption of inert gas while diving is also prevented, decompression sickness can therefore be prevented, and safety is thus improved.

2. Effect of the Invention

As described above, if the diving mode is accidentally entered while the diver is moving in a low pressure region, which is a location where the air pressure is lower than a predetermined atmospheric reference pressure (approximately equal to atmospheric pressure at sea level), and the time that the water entry monitoring switch is open exceeds a predetermined cancellation evaluation time, the dive computer 1 according to the present invention cancels the diving mode after user confirmation and returns to an operating mode that is used when not diving. It is therefore not necessary for the diver to return to where the depth measurement was 0 meters, and the erroneously activated operating mode can be cancelled without requiring a complicated operation by the user (diver).

Safety and reliability can also be improved because calculating tissue in/out-gassing based on measured values continues without interruption at regular intervals even when the pressure (air pressure) changes due to user (diver) movement in the atmosphere, continues even if the operating mode changes, and therefore affords more precise simulation.

Furthermore, the invention enables providing information relevant to the actual usage mode and can improve the reliability of the collected information because the operating mode is switched with user confirmation to a mode appropriate to use when not diving instead of continuing in the diving mode after the diving mode is wrongly entered when not in the water.

Furthermore, because the control unit 50 automatically executes a control program stored in ROM 53 to determine if a diving mode was entered erroneously, and evaluation does not depend on control afforded by a logic circuit arrangement of electronic devices as in the prior art, there is no increase in the number of devices required for control, the size of the control circuit board can be reduced, and a smaller, thinner diving information processing device can be provided.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2006-002955 filed Jan. 10, 2006 is expressly incorporated by reference herein.

What is claimed is:

1. A diving information processing device comprising:
a pressure measuring unit for measuring ambient pressure;
a timekeeping unit for measuring elapsed time;
a water entry detection unit for detecting an in-water condition;
a diving evaluation unit for determining that a diver is diving when an in-water condition is detected and the water depth corresponding to the pressure measured by the pressure measuring unit is deeper than a predetermined diving evaluation depth;
a depth measuring unit for measuring the water depth corresponding to the pressure measured by the pressure measuring unit during a dive;
a depth recording unit for recording the water depth and the elapsed time;
a low pressure region evaluation unit for determining movement in a low pressure region where the pressure is lower than a predetermined atmospheric reference pressure based on water entry detection by the water entry detection unit and the pressure measured by the pressure measuring unit; and
a depth measuring cancellation unit for cancelling depth measurement by the depth measuring unit when travel in a low pressure region is detected.

2. The diving information processing device described in claim 1, wherein:
the low pressure region evaluation unit detects movement in a low pressure region if the water entry detection unit detects a not-in-water condition continuously for a predetermined time after the diving evaluation unit has determined that the diver is diving.

3. The diving information processing device described in claim 1, wherein:
the water entry detection unit comprises detection electrodes for detecting conductivity through external water, and detects water entry when there is conductivity between the detection electrodes.

4. The diving information processing device described in claim 1, further comprising:
a pressure measurement resetting unit for resetting the pressure measuring unit at a predetermined pressure measurement timing of the pressure measuring unit when not diving.

5. The diving information processing device described in claim 1, further comprising:
a pressure measurement resetting unit for resetting the pressure measuring unit when a predetermined reset standby time passes after depth measurement is cancelled by the depth measuring cancellation unit.

6. The diving information processing device described in claim 4 or 5, wherein:
the pressure measurement resetting unit measures the atmospheric reference pressure when resetting the pressure measuring unit.

7. The diving information processing device described in claim 5, further comprising:
a standby time setting unit enabling the user to desirably set the reset standby time.

8. The diving information processing device described in claim 1, further comprising:
a safety information derivation unit for calculating tissue absorption and tissue elimination of inert gas based on the pressure and the elapsed time.

9. The diving information processing device described in claim 1, further comprising:
an operating unit enabling user operations; and
a manual recording cancellation unit for cancelling recording by the depth recording unit when a specific operation is executed on the operating unit.

10. A control method for a diving information processing device, comprising the steps of:
measuring ambient pressure, with a pressure measuring unit;
measuring elapsed time, with a timekeeping unit;
detecting an in-water condition, with a water entry detection unit;

calculating tissue absorption/elimination of inert gas with a safety information derivation unit based on the pressure and the elapsed time while diving;

determining that a diver is diving when an in-water condition is detected and the water depth corresponding to the pressure measured by the pressure measuring unit is deeper than a predetermined diving evaluation depth;

recording the water depth corresponding to the pressure measured by the pressure measuring unit together with the elapsed time during a dive;

detecting travel at a high altitude based on water entry detection by the water entry detection unit when the pressure measured by the pressure measuring unit is lower than a predetermined atmospheric reference pressure; and cancelling recording by the depth recording step when high altitude travel is detected.

11. A computer-readable medium having stored a control program for controlling a diving information processing device, the control program for performing the steps of:

measuring ambient pressure, with a pressure measuring unit;

measuring elapsed time, with a timekeeping unit;

detecting an in-water condition with a water entry detection unit;

calculating tissue absorption/elimination of inert gas with a safety information derivation unit based on the pressure and the elapsed time while diving;

determining that a diver is diving when an in-water condition is detected and the water depth corresponding to the pressure measured by the pressure measuring unit is deeper than a predetermined diving evaluation depth;

recording the water depth corresponding to the pressure measured by the pressure measuring unit together with the elapsed time during a dive;

detecting travel at a high altitude based on water entry detection by the water entry detection unit when the pressure measured by the pressure measuring unit is lower than a predetermined atmospheric reference pressure; and cancelling recording in the depth recording step when high altitude travel is detected.

* * * * *